US011537603B2

(12) United States Patent
Maichel et al.

(10) Patent No.: US 11,537,603 B2
(45) Date of Patent: Dec. 27, 2022

(54) SYSTEM AND METHOD FOR SQL SERVER RESOURCES AND PERMISSIONS ANALYSIS IN IDENTITY MANAGEMENT SYSTEMS

(71) Applicant: SailPoint Technologies Israel Ltd., Ramat Gan (IL)

(72) Inventors: Itay Maichel, Ra'anana (IL); Anatoly Gutnik, Herzliya (IL); Shlomi Wexler, Udim (IL)

(73) Assignee: SailPoint Technologies Israel Ltd., Ramat Gan (IL)

( * ) Notice: Subject to any disclaimer, the term of this patent is extended or adjusted under 35 U.S.C. 154(b) by 0 days.

(21) Appl. No.: 17/387,462

(22) Filed: Jul. 28, 2021

(65) Prior Publication Data

US 2022/0050835 A1 Feb. 17, 2022

Related U.S. Application Data

(60) Provisional application No. 63/064,182, filed on Aug. 11, 2020.

(51) Int. Cl.
*G06F 16/00* (2019.01)
*G06F 16/242* (2019.01)

(52) U.S. Cl.
CPC ............... *G06F 16/2433* (2019.01)

(58) Field of Classification Search
CPC .............. G06F 16/2433; G06F 21/00; G06F 2221/2145; G06F 17/30864; G06F 17/30867; G06F 17/30286; G06F 17/30595; G06F 16/285; G06F 16/93; G06Q 30/02; H04L 63/1425; H04L 63/101; H04L 63/205
See application file for complete search history.

(56) References Cited

U.S. PATENT DOCUMENTS

| 2015/0012966 | A1* | 1/2015 | Tandon | G06F 21/604 726/4 |
| 2019/0199729 | A1* | 6/2019 | Yared | H04L 63/104 |
| 2021/0318998 | A1* | 10/2021 | Filip | G06F 21/6218 |

* cited by examiner

*Primary Examiner* — Ashish Thomas
*Assistant Examiner* — Suman Rajaputra
(74) *Attorney, Agent, or Firm* — Sprinkle IP Law Group

(57) ABSTRACT

Embodiments as disclosed allow identity management with respect to SQL database by discovering substantially database objects and their entitlements and associating them with corresponding identities within the identity management system, thus providing insights into such SQL server entitlements and their associated identities, even across multiple SQL servers within an enterprise environment.

21 Claims, 6 Drawing Sheets

| ⓘ SailPoint | Dashboard | Resources | My Tasks | Reports | Compliance | Goals | Settings | Admin | New Access Request 🔔 ⑧ Administrator |
|---|---|---|---|---|---|---|---|---|---|

Activities | Permissions | Identities | Data Classification | Forensics

Permissions Forensics ⓘ  Saved Queries ▸  Global Options ▸

✓ Filters (1) ▸  Save | Clear All  Apply

| User Name | | Equals | | IAM_User | | | | |
|---|---|---|---|---|---|---|---|---|
| View by: | Everyone Groups Expanded Users Direct & Group Memb ▲ | | Mark permissions unused for longer than | 12 ▾ months | | | | |
| | Groups & Users Direct Permissions | | | | | | | |
| | Users Direct & Group Membership Permissions | er Name | User Domain | User Entity Type | Permission Type | Classification Category | | |
| ☐ | Busin Everyone Groups Expanded, Users Direct & Group Membership Permissions | | | | | | | |
| ☐ | [sig- | M_User | SIQ-MTZ-AUT1 | Local User | NEWANY DEFINITION ON SERVER | | | |
| ☐ | [sig-mtz-aut1.office.white... SQL Server Connector | FAM_User | SIQ-MTZ-AUT1 | Local User | NEWSERVER STATE ON SERVER | | | |
| ☐ | [sig-mtz-aut1.office.white... SQL Server Connector | FAM_User | SIQ-MTZ-AUT1 | Local User | CONNECT SQL ON SERVER | | | |
| ☐ | [sig-mtz-aut1.office.white... SQL Server Connector | FAM_User | SIQ-MTZ-AUT1 | Local User | CONNECT SQL ON SERVER | | | |
| ☐ | [sig-mtz-aut1.office.white... SQL Server Connector | FAM_User | SIQ-MTZ-AUT1 | Local User | NEWSERVER STATE ON SERVER | | | |
| ☐ | [sig-mtz-aut1.office.white... SQL Server Connector | FAM_User | SIQ-MTZ-AUT1 | Local User | NEWANY DEFINITION ON SERVER | | | |
| ☐ | [sig-mtz-aut1.office.white... SQL Server Connector | FAM_User | SIQ-MTZ-AUT1 | Local User | NEWSERVER STATE ON SERVER | | | |
| ☐ | [sig-mtz-aut1.office.white... SQL Server Connector | FAM_User | SIQ-MTZ-AUT1 | Local User | CONNECT SQL ON SERVER | | | |

FIG. 5A

SYSTEM AND METHOD FOR SQL SERVER RESOURCES AND PERMISSIONS ANALYSIS IN IDENTITY MANAGEMENT SYSTEMS

CROSS-REFERENCE TO RELATED APPLICATION(S)

This application claims a benefit of priority from U.S. Provisional Application No. 63/064,182, filed Aug. 11, 2020, entitled "SYSTEM AND METHOD FOR SQL SERVER RESOURCE AND PERMISSIONS ANALYSIS IN IDENTITY MANAGEMENT SYSTEMS," which is fully incorporated by reference herein for all purposes.

COPYRIGHT NOTICE

A portion of the disclosure of this patent document contains material to which a claim for copyright is made. The copyright owner has no objection to the facsimile reproduction by anyone of the patent document or the patent disclosure as it appears in the Patent and Trademark Office patent file or records but reserves all other copyright rights whatsoever.

TECHNICAL FIELD

This disclosure relates generally to computer security. In particular, this disclosure relates to identity management in a distributed and networked computing environment. Specifically, embodiments as disclosed herein relate to the collection and analysis of resources and entitlements in a distributed and networked computing environment for identity management purposes. Even more specifically, embodiments as disclosed may relate to the collection and analysis of resources and entitlements relating to SQL Server databases.

BACKGROUND

Acts of fraud, data tampering, privacy breaches, theft of intellectual property, and exposure of trade secrets have become front page news in today's world. The security access risk posed by insiders—persons who are granted access to information assets—is growing in magnitude, with the power to damage brand reputation, lower profits, and erode market capitalization.

Identity Management (IM), also known as Identity and Access Management (IAM) or Identity Governance (IG), is, the field of computer security concerned with the enablement and enforcement of policies and measures which allow and ensure that the right individuals access the right resources at the right times and for the right reasons. It addresses the need to ensure appropriate access to resources across increasingly heterogeneous technology environments and to meet increasingly rigorous compliance requirements.

Escalating security and privacy concerns are driving governance, access risk management, and compliance to the forefront of identity management. To effectively meet the requirements and desires imposed upon enterprises for identity management, these enterprises may be required to prove that they have strong and consistent controls over who has access to critical applications and data. And, in response to regulatory requirements and the growing security access risk, most enterprises have implemented some form of user access or identity governance.

Yet many enterprises still struggle with how to focus compliance efforts to address actual risk in what usually is a complex, distributed networked computing environment. Decisions about which access entitlements are desirable to grant a particular user are typically based on the roles that the user plays within the organization. In large organizations, granting and maintaining user access entitlements is a difficult and complex process, involving decisions regarding whether to grant entitlements to thousands of users and hundreds of different applications and databases. This complexity can be exacerbated by high employee turnover, reorganizations, and reconfigurations of the various accessible systems and resources.

Organizations that are unable to focus their identity compliance efforts on areas of greatest access risk can waste time, labor, and other resources applying compliance monitoring and controls across the board to all users and all applications. Furthermore, with no means to establish a baseline measurement of identity compliance, organizations have no way to quantify improvements over time and demonstrate that their identity controls are working and effectively reducing access risk.

Information Technology (IT) personnel of large organizations often feel that their greatest security risks stemmed from "insider threats," as opposed to external attacks. The access risks posed by insiders range from careless negligence to more serious cases of financial fraud, corporate espionage, or malicious sabotage of systems and data. Organizations that fail to proactively manage user access can face regulatory fines, litigation penalties, public relations fees, loss of customer trust, and ultimately lost revenue and lower stock valuation. To minimize the security risk posed by insiders (and outsiders), business entities and institutions alike often establish access or other governance policies that eliminate or at least reduce such access risks and implement proactive oversight and management of user access entitlements to ensure compliance with defined policies and other good practices.

One of the main goals of identity management, then, is to help users identify and mitigate risks. As IM is the discipline that ensures compliance with defined policies by aggregating, visualizing, and managing users and their access, implementations of IM systems may enable the automation of certain process within enterprises of organizations, including for example, provisioning, certifications, access reviews, and Separation of Duties (SOD) processes. Typical identity and access information available from IM solutions may utilize simple context to inform certain decision making processes, however additional, more complex, and specific, context may be desirable from a variety of perspectives, including managers, owners, IT or security/regulatory departments, or others. Without such complex contextual data information management systems may suffer from low workflow efficiency and lower security.

A microcosm of these problems occurs with respect to the access entitlements granted within an enterprise or other organization. Specifically, access to digital assets within an organization is typically granted in one of two ways: direct or effective (also referred to as indirect). When access is granted directly it is assigned or granted directly to a user. In other words, an access right or entitlement is associated with the user herself. For smaller organizations this may be typically how the assignment of access entitlements is accomplished. Such direct assignment does not, however, scale well to large enterprises, as direct management of such access entitlements for each user across each of the access entitlements within a large enterprise is untenable.

To help ameliorate this situation, often time users are granted effective access. Effective access is access that is assigned to a management structure and is inherited through an assignment of the user to the management structure or from the relationships of the digital assets themselves. Specifically, users may be assigned or associated with groups, logins, roles, folders, subfolders or other types of management collections or entities (collectively groups herein) maintained by a system, and access rights assigned to a group. In this manner, each user within the group is effectively assigned the access rights assigned to each group to whom that user belongs.

Certain systems or applications such as SQL Server or Active Directory, etc. may assist in the creation or management of these groupings and assignments. This indirect or effective access is thus traditionally implemented with respect to a logical structure, like a group (e.g., role), because this makes it efficient to assign a group to users and an access entitlement to a group, versus assigning the underlying access entitlement individually to each user.

As but one example, in SQL Server every securable has associated permissions that may be granted. These permissions are managed at a server level though logins and server roles and at the database level through database users and database roles.

Effective access also usually allows inheritance of access entitlements based on nested associations of groups. In other words, if a user is associated with a first group that is a subgroup of a second group, the user may indirectly (or effectively) be assigned the access entitlements assigned to both the second group and the first group. Thus, effective access can be multiple levels deep with complex inheritance structures. It will be realized that this added abstraction layer makes it difficult to understand what access a user actually has because of the depth and complexity of the underlying inheritance within such groups.

Thus, from an IM perspective such access rights, groups, and users must be managed (e.g., such as for the aforementioned IM process of provisioning, certifications, access reviews, or application of SOD policies, etc.), regardless of whether these access rights stem from direct or effective access. The management of effective access is however, not straightforward.

This difficulty stems in no small part from the highly complex and convoluted nature of management structures within a modern day enterprise, along with the sheer size of those enterprises. Thus, while manual correlation and verification of effective access and manual application of management processes is possible, such a solution is not scalable, leading to potential security risks. Because of the permutations of access entitlement and users, and the manners in which those users may be granted effective access (including the complexity and prevalence of a large number of management structures), these solutions do not allow for a timely or complete evaluation of effective access.

What is desired therefore, are improved systems and methods for identity governance that provide an infrastructure for detailed and relevant contextual identity governance information, including the procuring, providing, representation or modeling of both direct and indirect access granted in an enterprise.

SUMMARY

As mentioned, it is usually required for identity management solutions to deliver the capability for the creation, ongoing management, display, and distribution of detailed and relevant contextual identity governance information for an enterprise. This desire is prevalent at least because, within the Identity Governance (IG) space today, the best approaches to providing any sort of useful context are manual, ad hoc, and error prone (e.g., not repeatable with consistent outcomes). These limited approaches are not consistent, efficient, timely, or scalable.

Specifically, within an enterprise there may be many systems that are used to govern access or impose access controls on users, or otherwise secure, monitor or control access to entitlements within an enterprise. Such systems may work in a hierarchical or associative manner. Users may be grouped into groups, roles or other types of management collections or entities (collectively groups herein) and access rights assigned to a group. Thus, certain systems or applications within an enterprise, such as SQL Server or the like, may assist in the creation of management of these groupings and assignments.

In this manner, each user within a role is effectively assigned the access rights (e.g., permissions) assigned to each role to whom that user belongs. Moreover, these types of systems may allow management entities (e.g., groups or the like) to include one or more other management entities such that these management entities may be nested. In this manner, access entitlements may be inherited based on these nested associations of groups. For example, Active Directory allows hierarchies of groups and users to be defined and used to govern or manage privileged access.

Entitlements may also be granted implicitly. The implicit assignment of permissions may occur based on the structure of the objects or other assets of the underlying. Thus, permissions may be implicitly assigned to a user when the user (or group) is assigned a permission to a parent object (e.g., as defined by the schema of a database) such that the user is granted that permission to all child objects of that parent object. For example, if a user is given permission on a table of a database, that user may be automatically assigned that permission for each object of that table. As but one example, the permissions model of SQL server defines how permissions within SQL Server are inherited or implicitly granted.

Entitlements can therefore be given in many different manners, including directly, inherited, implicit or a combination (e.g., of inherited or implicit). The granting of such entitlements can thus be nested multiple level deeps. For example, if a group is given permission on a table, each user of that group inherits a permission on that table, which means additionally that each user is automatically implicitly assigned that permission for each object of that table.

What is desired is to discover and allow navigation of permission to identity on their most granular level. Embodiments of IG systems disclosed herein may provide such management tools. One particular type of these management tools is referred to as a Privileged Access Management (PAM) system. These PAM systems help organizations provide secure privileged access to critical assets and meet compliance requirements by managing and monitoring privileged accounts and access. Privileged accounts are, for example, "root" or "Administrator" accounts on a server, the root username/password for an Amazon Web Services account, or other similar "superuser" accounts, as opposed to non-superuser (normal user) accounts. PAM tools offer features that, for example, enable enterprises to discover privileged accounts on systems, devices and applications for subsequent management; automatically randomize, manage and vault passwords and other credentials for administrative, service and application accounts, control access to privileged accounts, including shared and "firecall" (emergency access) accounts, and isolate, monitor, record and audit privileged access sessions, commands and actions.

Identity management systems as disclosed may obtain data on identity management artifacts (e.g., such as an identity, entitlement, role, group, event, access profile or account activity) such that these artifacts may be associated and managed accordingly. These artifacts may be imported or determined from data obtained from a set of source systems within an enterprise. For example, certain identity management systems such as SailPoint's IdentityIQ File Access Manager (FAM) may govern access to data by identifying and monitoring access to such sensitive data. Embodiments of such IM systems may allow the management of access rights and users for various IM tasks, including the provisioning of entitlements, certifications, access reviews, or application of separation of duties policies.

Many of these tasks revolve around entitlements granted to identities (e.g., users or groups thereof) for a digital asset within an enterprise. Thus, it is extremely important to understand the entitlements granted to users with respect to the various assets with the enterprise so users can view in one place entitlements for assets related to particular users or roles and how such entitlements are interrelates such that it can be determined if such entitlements should actually be granted to a user. Generally then, these it is desirable that such identity management systems provide tools for viewing, verification, validation or auditing such entitlements and provide forensic queries for such entitlements that are intuitive and easy to use.

In the context of such identity management, discovering and analyzing permissions on database objects (e.g., from SQL databases) is a tedious and complex task. There may be thousands, hundreds of thousands or even millions of objects within a SQL database, each with its own entitlements. Moreover, entitlements to the objects of such a SQL database may be granted indirectly through multiple levels of inheritance, as discussed.

Many solutions involve manual work which provide may only be able to provide partial answers to such questions. This manual work usually involves directly connecting to an SQL server by a user, opening each desired object and looking at its direct permission. These prior solution are deficient at least because they are unable to show inherited or implicit permissions, (e.g., permissions granted through nested groups or object hierarchies). Accordingly, these types of solutions cannot provide interfaces to assist user in answering broader questions on a user-centric approach (e.g., 'all permissions for all database objects for a specific user'), as they cannot determine such information.

To address these deficiencies and desires, among other ends, embodiments as disclosed herein may utilize connectors that collect and analyze resources (e.g., database objects and their permissions) in a distributed and networked computing environment for identity management purposes, including the collection of permissions on the resources) and the classification of data which reside in these resources (e.g., data in rows in database tables). Specifically, embodiments as disclosed may relate to such connectors in the context of Microsoft's SQL Server database.

Embodiments as disclosed are thus aimed at solving the difficulty inherent in identity management with respect to such SQL databases by automatically discovering substantially all the database objects and their permissions and associating them with corresponding identities within the identity management system, thus providing users insights into such SQL server entitlements and their associated identities, even across multiple SQL servers within an enterprise environment. These insights may allow users to quickly answer questions like 'Who has access to this database object' or 'What kind of access a specific user has and how this access is granted (directly, via group, nested group, implicit permission, etc.).'

Embodiments as disclosed herein may thus include a SQL permissions collector. The SQL permissions collector connects to an SQL server instance, performs SQL queries to discover the database resources (tables, views, stored procedures, functions, etc.) of databases at that server, and then queries the database for all the direct permissions for every object, as well as database level permissions propagating to all child resources. The collected or determined data can be modeled in a data model used by an identity management system (e.g., a FAM system) composed of entities and their relations. These entities may include, for example, identities (e.g., user/group), resource (also referred to as an assets) (e.g., tables) and permission types.

The modeled entitlements are thus associated with identities and persists the data into the an identity management database which may be adapted perform queries for such data. Thus, a user's or group's entitlements for all systems across an enterprise, including users' entitlements with respect to multiple SQL servers and SQL databases may be stored and accessed (e.g., queried or viewed) as part of a single system. Thus these direct, inherited and implicitly assigned entitlements may be flattened and associated with an identity, so they can be readily perceived and viewed on an identity by identity basis, using the identity model of the identity management system. Thus, inherited or implicit (collectively referred to as inherited or implicit interchangeably hereinafter) entitlements associated with an identity may be made explicit in embodiments of the identity management system.

Specifically, permissions data may be stored in a unified database which enables different capabilities on the data such as fine-grained forensics, reporting, timed access re-certification campaign, automated access request workflows simulations and more. Embodiments as disclosed may thus shorten the time it takes to understand who has access to what.

In particular, embodiments of the identity management system may offer a user interface through which such SQL server entitlement data may be accessed, queried and viewed. Such a user interface may the same type of interface that may be provided by the identity management system for querying and viewing entitlement data for identities and entitlements related to other source systems within the enterprise. Thus, such a unified user interface may give a user the same, or similar, filter, searching or viewing capabilities as that offered for other source systems.

Embodiments of such an interface may allow entitlements to be queried on a per user basis and display entitlements, including entitlements related to the SQL server on a user level, including individual entitlements related to an SQL server that were assigned to a user through both inheritance or implicitly, even though multiple levels of inherency or implicit assignments of those entitlements. Moreover, the "nesting chain" (e.g., the set of inheritances or implicit assignments of entitlements, such as the roles or schemas through which the entitlement was granted) may also be displayed or queried through the user interface. Additionally, using such an interface, a user's entitlements related to all SQL servers in an enterprise may be viewed in a single context, regardless of the distribution or number of those SQL servers within the enterprise environment.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIGS. 5A, 5B and 5C are diagrams of embodiments of user interfaces that may be used by an identity management system.

DETAILED DESCRIPTION

Figure 1:
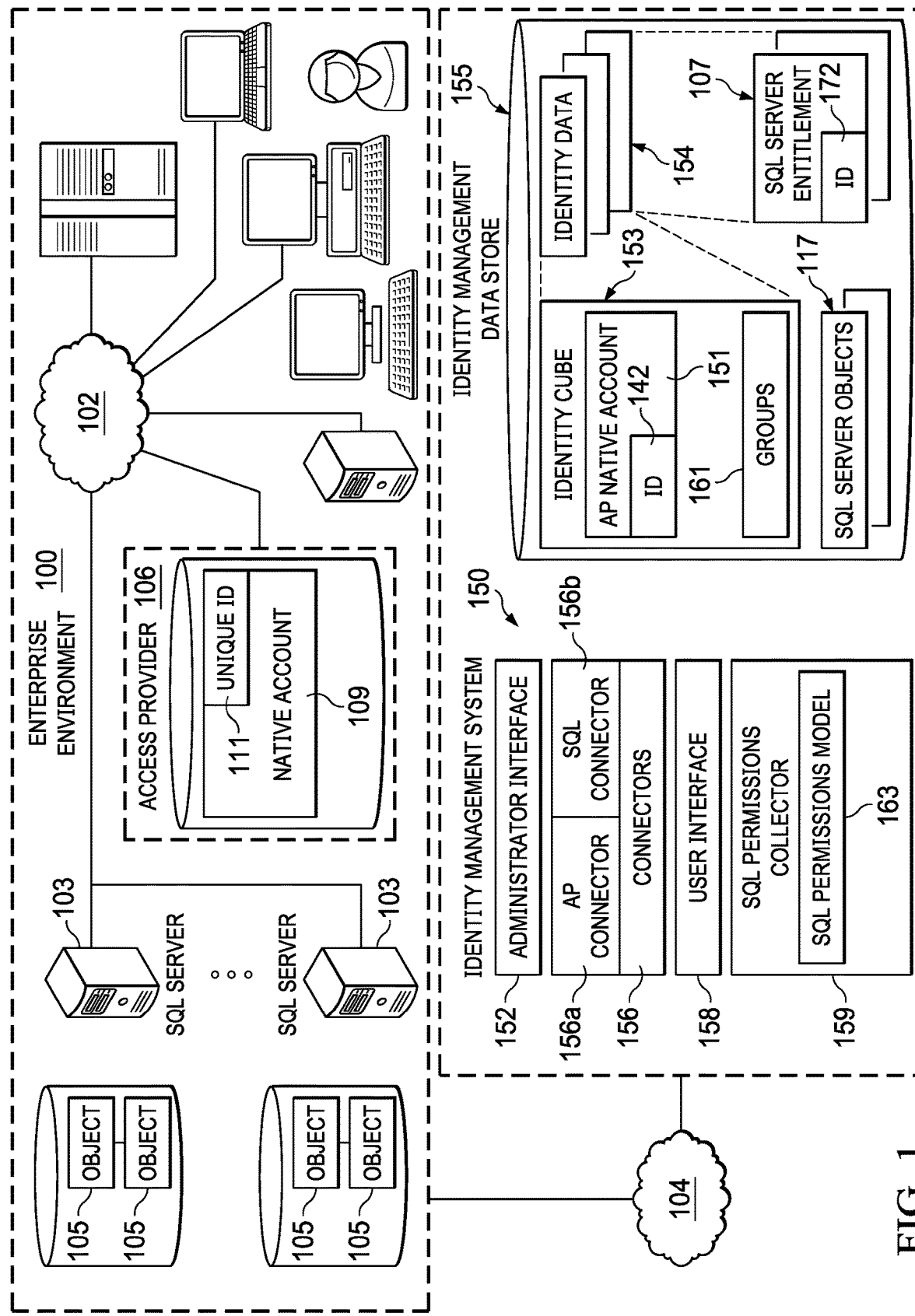
FIG. 1 is a block diagram of a distributed networked computer environment including one embodiment of an identity management system.

The invention and the various features and advantageous details thereof are explained more fully with reference to the nonlimiting embodiments that are illustrated in the accompanying drawings and detailed in the following description as included in the Appendix. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Before delving into more detail regarding the specific embodiments disclosed herein, some context may be helpful. In response to regulatory requirements and security access risks and concerns, most enterprises have implemented some form of computer security or access controls. To assist in implementing security measures and access controls in an enterprise environment, many of these enterprises have implemented Identity Management in association with their distributed networked computer environments. Identity Management solutions allow the definition of particular identity management artifacts (including but not limited to, an identity, entitlement, application, account, role, event, policy, group, permission, user, owner, source, configuration, organization, violation, governance group, access profile or account activity) such that these artifacts may be associated and managed accordingly.

For example, an identity may be almost physical or virtual thing, place, person or other item that an enterprise would like to define. Identities can therefore be, for example, certain capacities (e.g., manager, engineer, team leader, etc.), titles (e.g., Chief Technology Officer), groups (development, testing, accounting, etc.), processes (e.g., nightly back-up process), physical locations (e.g., cafeteria, conference room), individual users or humans (e.g., John Locke) or almost any other physical or virtual thing, place, person or other item.

To continue with these example of how these identity governance artifacts may be used, each of these identities may therefore be assigned zero or more entitlements with respect to the distributed networked computer environments. An entitlement may be the ability to perform or access a digital asset or function within the distributed networked computer environments, including, for example, accessing computing systems, databases, objects of databases, applications, file systems, particular data or data items, networks, subnetworks or network locations, etc.

To facilitate the assignment of these entitlements, enterprises may also be provided with the ability to define roles or other identity management artifacts within the context of their Identity Management solution. A role within the context of Identity Management may be a collection of entitlements. These roles may be assigned a name or identifiers (e.g., manager, engineer, team leader) by an enterprise that designate the type of user or identity that should be assigned such a role. By assigning a role to an identity in the identity management context, the identity may be assigned the corresponding collection of entitlements associated with the assigned role. Accordingly, by defining these roles enterprises may define a "gold standard" of what they desire their identity governance to look like.

Thus, by managing the identity management artifacts using an identity management system, identity governance may be facilitated. For example, by managing the artifacts (e.g., identity or identities, roles, entitlements, etc.) to which users within the enterprise computing environment are assigned, the entitlements or roles to which a user may be assigned (e.g., the functions or access which a user may be allowed) may be controlled. Furthermore, by defining other identity management artifacts, such as more granular access permissions, identity management events or activity may also be determined and evaluated to assess security risk or compliance with identity management policies or rules.

One of the main goals of IM, then, is to help users identify and mitigate risks associated with access management. As IM is the discipline that ensures compliance with defined policies by aggregating, visualizing, and managing users and their access, implementations of IM systems may enable the automation of certain process within enterprises of organizations, including for example, provisioning, certifications, access reviews, and SOD processes. Typical identity and access information available from IM solutions may utilize simple context to inform certain decision making processes, however additional, more complex and specific, context may be desirable from a variety of perspectives, including managers, owners, IT or security/regulatory departments, or others. Without such complex contextual data information management systems may suffer from low workflow efficiency and lower security.

It would therefore by desirable for identity management solutions to offer the capability for the provisioning of detailed and relevant contextual identity governance information for an enterprise. This desire is prevalent at least because within the IG space today, the best approaches to providing any sort of useful context are manual, ad hoc, and error prone (e.g., not repeatable with consistent outcomes).

As discussed, a manifestation of these problems occurs with respect to SQL servers within an enterprise environment. There may be thousands, hundreds of thousands or even millions of objects within a SQL database, each with its own entitlements. Moreover, entitlements to the objects of such a SQL database may be granted indirectly through multiple levels of inheritance, as discussed.

Specifically, access to digital assets within a SQL server may be granted in an effective manner. Effective access (also referred to as inherited or implicit access herein) is access that is assigned to a management structure and is inherited through an assignment of the user to the management structure, or from the relationships of the digital assets (e.g., database objects) themselves. Certain systems or applications such as Active Directory may assist in the creation of management of these groupings and assignments.

This indirect or effective access is thus traditionally implemented with respect to a logical structure, like an Active Directory group, because this makes it efficient to assign a group to users and an access entitlement to a group, versus assigning the underlying access entitlement individually to each user. Thus, from an IM perspective such access rights and users must be managed (e.g., such as for the aforementioned IM process of provisioning, certifications, access reviews, or application of SOD policies), regardless of whether these access rights to SQL server objects stem from direct or effective access.

Embodiments as disclosed are thus aimed at solving the difficulty inherent in identity management with respect to such SQL databases by automatically discovering substantially all the database objects and their permissions and associating them with corresponding identities within the identity management system, thus providing insights into such SQL server entitlements and their associated identities.

Embodiments as disclosed herein may thus include a SQL permissions collector. The SQL permissions collector may connect to an SQL server instance, perform SQL queries to discover the database resources (tables, views, stored procedures, functions, etc.) of databases at that server, and then query the database for all the direct permissions for every object, as well as database level permissions propagating to all child resources. The collected or determined data can be modeled in a data model used by an identity management system (e.g., a FAM system) composed of entities and their relations. These entities may include, for example, identities (e.g., user/group), resource (also referred to as an assets) (e.g., tables) and permission types. The modeled entitlements are thus associated with identities and persists the data into the an identity management database which may be adapted perform queries for such data.

Embodiments of an identity management system as disclosed herein may thus utilize embodiments of a data model that associates identities with their respective entitlements, while maintain data on the hierarchy or inheritance structures imposed by the SQL system from which those entitlement were derived, including any structure that resulted in the (direct or effective) assignment of such an entitlement along with the hierarchical nature of the digital assets to which those entitlements pertain.

Accordingly, a user's or group's entitlements for all systems across an enterprise, including users' entitlements with respect to multiple distinct SQL servers and SQL databases may be stored and accessed (e.g., queried or viewed) as part of a single system. Thus these direct, inherited and implicitly assigned entitlements may be flattened and associated with an identity, so they can be readily perceived and viewed on an identity by identity basis, using the identity model of the identity management system. Thus, inherited or implicit (collectively referred to as inherited or implicit interchangeably herein) entitlements associated with an identity may be made explicit in embodiments of the identity management system.

Specifically, entitlement data may be stored in a unified database which enables different capabilities on the data such as fine-grained forensics, reporting, timed access re-certification campaign, automated access request workflows simulations and more. Embodiments as disclosed may thus shorten the time it takes to understand who has access to what.

In particular, embodiments of the identity management system may offer a user interface through which such SQL database server entitlement data may be accessed, queried, or viewed. Such a user interface may the same type of interface that may be provided by the identity management system for querying and viewing entitlement data for identities and entitlements related to other source systems within the enterprise. Thus, such a unified user interface may give a user the same, or similar, filter, searching or viewing capabilities as that offered for other source systems.

Embodiments of such an interface may allow entitlements to be queried on a per user basis and display entitlements, including entitlements related to multiple SQL servers on a user level, including individual entitlements related to an SQL server that were assigned to a user through both inheritance or implicitly, even though multiple levels of inherency or implicit assignments of those entitlements. Moreover, the "nesting chain" (e.g., the set of inheritances or implicit assignments of entitlements, such as the roles or schemas through which the entitlement was granted) may also be displayed or queried through the user interface.

Turning then to FIG. 1, then, a distributed networked computer environment including one embodiment of such an identity management system is depicted. Here, the networked computer environment may include an enterprise computing environment 100. Enterprise environment 100 includes a number of computing devices or applications that may be coupled over a computer network 102 or combination of computer networks, such as the Internet, an intranet, an internet, a Wide Area Network (WAN), a Local Area Network (LAN), a cellular network, a wireless or wired network, or another type of network. Enterprise environment 100 may thus include a number of resources, various resource groups and users associated with an enterprise (for purposes of this disclosure any for profit or non-profit entity or organization). Users may have various roles, job functions, responsibilities, etc. to perform within various processes or tasks associated with enterprise environment 100. Users can include employees, supervisors, managers, IT personnel, vendors, suppliers, customers, robotic or application based users, etc. associated with enterprise 100.

Users may access resources of the enterprise environment 100 to perform functions associated with their jobs, obtain information about enterprise 100 and its products, services, and resources, enter or manipulate information regarding the same, monitor activity in enterprise 100, order supplies and services for enterprise 100, manage inventory, generate financial analyses and reports, or generally to perform any task, activity or process related to the enterprise 100. Thus, to accomplish their responsibilities, users may have entitlements to access resources (e.g., digital assets) of the enterprise environment 100. These entitlements may give rise to risk of negligent or malicious use of resources.

Specifically, to accomplish different functions, different users may have differing access entitlements to differing resources. Some access entitlements may allow particular users to obtain, enter, manipulate, etc. information in resources which may be relatively innocuous. Some access entitlements may allow particular users to manipulate information in resources of the enterprise 100 which might be relatively sensitive. Some sensitive information can include human resource files, financial records, marketing plans, intellectual property files, etc. Access to sensitive information can allow negligent or malicious activities to harm the enterprise itself. Access risks can thus result from a user having entitlements with which the user can access resources that the particular user should not have access to; gain access to another user's entitlements or for other reasons. Access risks can also arise from roles or groups in enterprise environment 100 which may shift, change, evolve, etc. leaving entitlements non optimally distributed among various users.

These access risks may be particularly difficult to manage in association with certain resources utilized by the enterprise 100. For example, enterprise 100 may make used of SQL servers 103 for various functionality. SQL servers 103 include a data store provide data storage over a network (often times the Internet, an intranet, etc.). There may be thousands, hundreds of thousands or even millions of objects 105 (sometime referred to as "securables" by certain SQL server providers) within a SQL database of the SQL server, each with its own entitlements. Moreover, entitlements to the objects 103 of such a SQL database may be granted indirectly through multiple levels of inheritance, as discussed.

Another of the resources that may be utilized by the enterprise 100 is access provider 106. As but one example, Active Directory (AD) may be deployed as an access provider 106 within the enterprise 100. Such an access provider may include a federated access provider, such as Active Directory Federated Access. Other examples include Okta or Ping. A user may have a native account 109 with the access provider 106 whereby the user may be authenticated by the access provider 106 using the native account 109. A user may be identified with a unique identifier 111 for such an account. Such an identifier may, for example, be a Security IDentifier (SID), as is used in certain Microsoft environments. Such accounts 109 may allow a user within the enterprise to access entitlements (e.g., such as systems and applications) including SQL server 103. Such access may also include those entitlements located across the enterprises organizational boundaries based upon a single sign on (e.g., a single validation of the users credentials using the user's native account 109), including access to SQL server 103.

Complicating this access pattern is that such entitlements (e.g., to SQL server 103) may be granted by the access service 106 based on the user's association with one or more indirect assignments of entitlements through assignment to a role or a group. Thus, for example, a user may be a member of a role or a group such that by signing on though the access service 106, the user is associated with a group or other entitlement, where that group has been assigned or granted entitlements which allow members of that group to access or utilize various functionality of the SQL server 103. Such roles are groups may also have unique identifiers (e.g., SIDs) associated with them.

To assist in managing the artifacts (e.g., identity, entitlement, roles, etc.) assigned to various users and more generally in managing and assessing access risks in enterprise environment 100, an identity management system 150 may be employed. Such an identity management system 150 may allow an administrative or other type of user (or the identity management system 150 itself) to define one or more identity management artifacts such as an identity, entitlement, group, role, event, access profile or account activity, and associate these defined identity management artifacts using, for example, an administrator interface 152. For example, defined identities may be associated with entitlements, groups or roles. The assignment may occur, for example, by directly assigning an entitlement to an identity, or by assigning a group or role to an identity whereby the collection of entitlements comprising the role are thus associated with the identity. Examples of such identity management systems are SailPoint's IdentityIQ (e.g., File Access Manager (FAM)) and IdentityNow products. Note here, that while the identity management system 150 has been depicted in the diagram as separate and distinct from the enterprise environment 100 and coupled to enterprise environment 100 over a computer network 104 (which may the same as, or different than, network 102), it will be realized that such an identity management system 150, or components thereof, may be deployed as part of the enterprise environment 100, remotely from the enterprise environment, as a cloud based application or set of services, or in another configuration.

It may be helpful to illustrate some examples of identity management artifacts and their usage. As one example, an identity may thus be almost physical or virtual thing, place, person or other item that an enterprise would like to define. Thus, an identity may be an individual or group of users or humans, employees, a virtual entity like a sensor or a robot, an account and may include capacity, title, groups, processes, physical locations, or almost any other physical or virtual thing, place, person or other item. In one embodiment, an Identity may be an authoritative account that includes a first name, a last name and an email address.

As another example, an entitlement may be the ability to perform or access a resource or function within the distributed networked enterprise computer environment 100, including, for example, SQL server 103 or objects 105 thereof, accessing computing systems, applications, files, file systems (or portions thereof), physical locations, particular data or data items, networks, subnetworks or network locations, etc. Entitlements may also define the actions a user can take with respect to that access or resource (e.g., digital asset). Each of these identities may therefore be assigned zero or more entitlements with respect to the distributed networked computer environments.

Another example of an identity management artifact may be a role. Roles may be used to facilitate the assignment of these entitlements. Thus, enterprises may also be provided with the ability to define roles through the identity management system 150. A role within the context of the identity management system 150 may be a collection of entitlements, or access profiles, that may span different source systems. These roles may be assigned a name or identifiers (e.g., manager, engineer, team leader) by an enterprise that designate the type of user or identity that should be assigned such a role. By assigning a role to an identity or group of identities using the identity management system 150, the identity may be assigned the corresponding collection of entitlements or access items associated with the assigned role. Similarly, enterprises may also be provided with the ability to define access profiles. An access profile may be a set of entitlements that represent a level of logical access (e.g., user, guest, administrator, etc.) to a source or applications.

Connectors 156 of the identity management system 150 may thus request or otherwise obtain data from various touchpoint (or source) systems within enterprise environment 100 to obtain identity management data 154. These source systems may include, for example Active Directory systems, Microsoft SQL servers 103, Java Database Connectors within the enterprise 100, Azure Active Directory servers, OpenLDAP servers, Oracle Databases, SalesForce applications, ServiceNow applications, SAP applications or Google GSuite systems.

It is axiomatic that to manage, aggregate, or visualize users and their accesses along with other pertinent IM data, it is first necessary to determine what the identity management artifacts pertinent to the organization are. Given the volume of data within an enterprise that may be obtained to determine IM data on identities, entitlements, roles, groups, or other identity management artifacts, and the typically large number of source systems from which the data may be obtained, correlating or processing this data to make canonical determinations about identities or other artifacts and more generally, associate such data pertaining to like artifacts may be extremely difficult. Such problems may manifest, for example, during a deployment process of an identity management system 150 with respect to an enterprise environment 100 (e.g., an initial deployment or integration of identity management system 150 with enterprise environment 100 or a subsequent harvesting of data from a source system within the enterprise environment 100) as hundreds or thousands of accounts are harvested by connectors 156 across the source systems of the enterprise environment 100.

Identity management system 150 may thus need a way to effectively deal with volume of such data from the source systems to allow this identity management data to be effectively evaluated and understood. Specifically, in most cases, identity management system 150 obtains data on identity management artifacts from various touchpoint (or source) systems within an enterprise environment 100 through connectors 156. The obtained data is stored in identity management data 154, then processed to determine identity management artifacts (or updates to identity management artifacts) to be stored and maintained at the identity management system 150 in identity management data 154 to facilitate identity governance with respect to the enterprise. This process is sometimes referred to as data ingestion or the data ingestion stage.

This data ingestion stage therefore usually determines and associates identity management artifacts (e.g., identities, accounts, entitlements, etc.) in a manner that facilitates identity governance of those artifact. There is usually a large amount of data that is collected from different source systems that pertains to the same identity management artifact. For example, with respect to identities, during a data ingestion stage, tens, or hundreds, of thousands (or more) accounts may be harvested from different source systems across an enterprise. Some of these accounts may pertain to the same user, or more generally to the same identity. Thus, to establish an identity at the identity management system, where that identity may be a canonical identity management artifact for that identity the various accounts from across source systems are correlated or matched (used interchangeably herein) to determine which accounts should be associated with the same identity.

To illustrate in more detail, certain source systems may be designated as, or determined to be, an authoritative source system. Accounts from these authoritative source systems may include direct, identity-specific information (e.g., such as a SID, Social Security Number or the like) that makes it possible to establish a comprehensive list of the identities within the enterprise. An example of such an authoritative source system may be a human resources system or the like. The data on accounts from these authoritative source systems may be harvested by connectors 156 and stored in identity management data 154, where each account from these authoritative source systems may be taken as referring to an identity that may be used for IM purposes. These accounts (e.g., a set of data associated with a distinct account at the authoritative source system) from authoritative source systems are thus referred to herein without loss of generality as identity accounts. These identity accounts may thus be definitively correlated with (or used to create) an identity. As discussed, the identity management data 154 for an artifact (e.g., identity) can be stored in a cube (e.g., "Identity Cube") where all identity management data 154 associated with a particular artifact (e.g., for an identity all of their accounts from all data sources, and all attributes and entitlements of those accounts) may be associated.

Other source systems within the enterprise environment 100 may be non-authoritative source systems (e.g., that do not contain such direct, identity specific information). The data on accounts from these non-authoritative source systems may also be harvested by connectors 156 and stored in identity management data 154. To facilitate IM with respect to enterprise environment 100 then, identity management system 150 correlates these other, non-authoritative accounts (e.g., from non-authoritative source system) with the corresponding identities (e.g., that may be correlated with or created from accounts from the authoritative source system).

The identity management system 150 can thus store identity management data 154 in an identity management data store 155. This identity management data store 155 may be, for example, a relational data store, including SQL based data stores such as a MySQL database or the like. The identity management data 154 stored may include a set entries, each entry corresponding to an identity management artifact as discussed. This entry may comprise one or more identifiers for the identity, including for example, one or more identifiers used for accounts related to that identity by the source systems (e.g., access provider 106) within the enterprise environment 100. For example, the identity management data 154 may include entries on an identity (e.g., alphanumerical identifiers for identities) as defined and managed by the identity management system, a list or vector of entitlements, roles or access profiles assigned to that identity by the identity management system or other types of artifacts. A time stamp at which the identity management data was collected (e.g., from a source system) may be associated with the data for a particular artifact. Other data could also be associated with each artifact, including data that may be provided from other systems such as a title, location or department associated with the identity.

As discussed, in one embodiment, the identity management data 154 for an artifact (e.g., identity) can be stored in a management entity of "cube" where all identity management data 154 associated with a particular artifact (e.g., for an identity all of their accounts from all data sources, and all attributes and entitlements of those accounts) may be associated. All such management entities comprising a collection of data about an identity artifact may also be referred to herein as an "Identity Cube" without loss of generality.

As another example, the identity management data 154 may also include entries corresponding to entitlements, groups or roles, where each entry for a group or role may include the role identifier (e.g., alphanumerical identifier or name for the role) and a list or vector of the entitlements associated with each role. Other data could also be associated with each group or role, such as a title, location or department associated with the role. Moreover, the identity management data 154 may also include event data collected from various systems within the enterprise environment 100 that is associated with the identities defined in the identity management data 154 through the evaluation or analysis of these events or other data in an identity management context. A user may interact with the identity management system 150 through a user interface 158 to access or manipulate data on identities, roles, entitlements, events or generally preform identity management with respect to enterprise environment 100.

In one embodiment, therefore, an Identity Cube 153 for a user may include that user's native account 151 at the access provider 109 (e.g., as obtained by an associated connector 156a from the access provider 109). The native account 151 can be represented, for example, by an entitlement artifact for the account associated with the user's Identity Cube 153, where that entitlement artifact references the unique identifier 142 (e.g., the SID) of that user's native account with the access provider 109.

Moreover, the groups or roles 161 to which a user belongs may also be obtained from the access provider 109 and associated with the user's identity cube 153. These groups 161 may be identified by an identifier used by the access provider 109 or other systems of the enterprise environment 100. Such an identifier may, for example, be a SID, as is used in certain Microsoft environments. For example, the identity management data 154 may include an identifier for a group 161, where that group include identifiers 142 for all identities that are included in the group 161.

As discussed, the association of an identity with entitlements related to objects 105 of SQL servers 103 may be difficult. There may be thousands, hundreds of thousands or even millions of objects 105 within a SQL database, each with its own entitlements. Moreover, entitlements to the objects 105 of such a SQL database may be granted indirectly through multiple levels of inheritance.

Embodiments as disclosed are thus aimed at solving the difficulty inherent in identity management with respect to such SQL databases by automatically discovering entitlements related to the database objects 105 of the SQL server 103 and their permissions and associating them with corresponding identities within the identity management system 150, thus providing insights into such SQL server entitlements and their associated identities.

Accordingly, embodiments include a SQL server database connector 156b adapted to interface with the SQL server 103 and which may be configured with the access credentials of an associated SQL server 103. In some embodiments, there may be a SQL server database connector 156b corresponding to each SQL server 103 of the enterprise environment 100 and adapted to access the corresponding SQL server 103. Such SQL server database connectors 156b may, for example, be installed directly on an associated SQL server 103 within the enterprise environment 100.

Using such SQL server database connectors 156b, SQL permissions collector 159 connects to an SQL server instance 103, perform SQL queries to discover the database objects (tables, views, stored procedures, functions, etc.) of databases at that server 103, and then queries the database for all the direct permissions for every object, as well as database level permissions propagating to all child resources. The collected or determined data can be modeled in the data model used by the identity management system 150. The modeled entitlements 107 of the SQL server can thus be associated with corresponding identities 153 and persisted into the an identity management data 154.

Specifically, in one embodiment, SQL permissions collector 159 may be a service that can be activated by request, at a set schedule, etc. The SQL permissions collector 159 may, when activated, obtain data from all the SQL servers 103 across the enterprise environment. Such collection of data from a particular SQL server 103 may be accomplished in two operations.

The first operations may be a crawl of the associated SQL server 103. During the crawl all the databases of the associated SQL server 103 may be iterated over and all the objects of each database obtained. A representation 117 of these obtained SQL server objects can be created in the identity management data 154.

During the harvest (e.g., the second operations) each object obtained in the crawl is accessed at the SQL server 103 to get its permissions, including direct and explicit permissions for users and groups, inherited permissions, implicit permissions, or other permissions for the object.

Specifically, during this permissions collection, permissions on the objects of each database of the SQL server 103 may be determined (e.g., server level permission, database permissions, table level permission, object level permissions, etc.). Each of these permissions may be associated with one or more identifiers of users or groups who have been assigned that permission by SQL server 103. Such an identifier may, for example, a SID as is used in certain Microsoft environments. A representation 107 of these obtained SQL server permissions can be created in the identity management data 154 and linked with the corresponding object 107 to which the permission applies. This representation 107 may include an identifier for the permission, along with a link to the object 117 to which the permission applies and an identifier 172 of each user or group who has that permission. Again, this identifiers may be the SID of that user or group.

Thus, because the data model utilized by the identity management system 150 to store the identity management data 154 may include a representation of identities in an identity cube 153 that includes an identifier 142 for that identity or groups to which that identity belongs, and each SQL server entitlement 107 includes an identifier for each identity or group to which that entitlement has been granted along with a link to each SQL server object 117 to which that entitlement pertains, all of an identity's 153 SQL entitlements 107, and the objects to which those entitlements 107 apply, can be determined by correlating the identifiers 142 associated with an identity 153 and the identifiers 172 associated with the SQL server entitlements 107.

Moreover, when SQL server permissions are obtained or determined, permissions on sub-objects of these objects may also be obtained or determined. For example, permissions on sub-objects of an object 107 (which are themselves objects 107) may be provided by the SQL server 103. Additionally, SQL permissions collector 159 may be configured with an SQL permissions model 163 that describes the database or server permissions for the SQL server 103. This SQL permissions model 163 may described sub-objects of an object 107 that are implicitly granted the permissions on an object 107 (e.g., if an identity has a permission on a database it may implicitly be assigned that permission on each table of the database). Such a permissions model 163 may allow an identity's permissions on sub-objects of an object 107 to be determined from that identity's permission on an object 107.

Accordingly, a user may interact with the identity management system 150 through a user interface 158 to access or manipulate data on identities and SQL entitlements 107 and SQL objects 107. In particular, a user interface may offer the ability for a user to specify (e.g., or search for) an identity (e.g., user or group) and view all of that identity's SQL server entitlements (e.g., including the objects 107 corresponding to those entitlements), even when such SQL entitlements span multiple SQL servers 103 within the enterprise environment 100 or when such entitlements 107 have been granted to user through inheritance by virtue of that identity's association with a group. Thus users of an enterprise can view all their SQL data holistically in one place through a single interface.

Specifically, when a particular identity is specified through the interface 158 the SQL permissions collector 159 may access the identity cube 153 to obtain the identity's identifier 142 (e.g., a SID for the identity). The identifier 142 for the identity may be used to determine the SQL server entitlements 107 (and associated objects) associated with that identity's identifier 142 using the identifier 172 (e.g., SID) associated with the SQL server entitlements 107. Moreover, using the identity's identifier 142 any groups 161 associated with that identity may be determined and the identifier for those groups 161 (e.g., a SID associated with the group) may be used to determine the SQL server entitlements 107 (and associated objects) associated with that group's identifier using the identifier 172 (e.g., SID) associated with the SQL server entitlements 107.

Additionally, once the SQL server entitlements 107 (including their associated SQL server objects 117), are determined SQL permissions model 163 may be accessed to determine if there are any objects 107 that are sub-objects of the determined SQL server objects 117 for those entitlements 117 such that the identity has been implicitly granted that entitlement 117 on those (sub) objects 107. Specifically, for each determined SQL server object 117 associated with an SQL server entitlement 107 determined for an identity 153, the determined SQL permissions model 163 may be accessed and used to identify any objects 107 that are sub-objects of that object that are granted the same entitlement as the entitlement 117 granted on the (parent) object 107. Each identified (sub) object 107 granted the same entitlement 117 as the identified (parent) object 107 may be added to the list of entitlements 117 and SQL server objects 107 associated with the identity. This determination may be done recursively for each object 107 and (sub) object 107 until there are no more sub-objects for which that entitlement 117 has been implicitly assigned to the identity.

Such an interface 158 may similarly be used to access or determine identities 153 or entitlements 117 associated with a particular (or meeting certain criteria) SQL database object 107 (or type of SQL database object); SQL database objects 107 or identities 153 associated with a particular (or meeting certain criteria) SQL entitlement 117; or to obtain, determine, sort or otherwise view or filter SQL server data from SQL servers 103 across the enterprise environment.

In this manner, embodiments of an identity management system 150 including an SQL permission collector 159 can collate and collect all data from across enterprises SQL servers 103 and manage and collect such data in a centralized (or centrally accessible) location. By collecting and collating such data, embodiment of an identity management system 150 may allow users to locate all of a single identity's SQL server entitlements across all enterprise SQL servers from a single location, including those SQL server entitlements that are inherited through that identity's association with management structures such as roles or groups or implicitly granted through the structure or schema of the SQL databases themselves.

Figure 2:
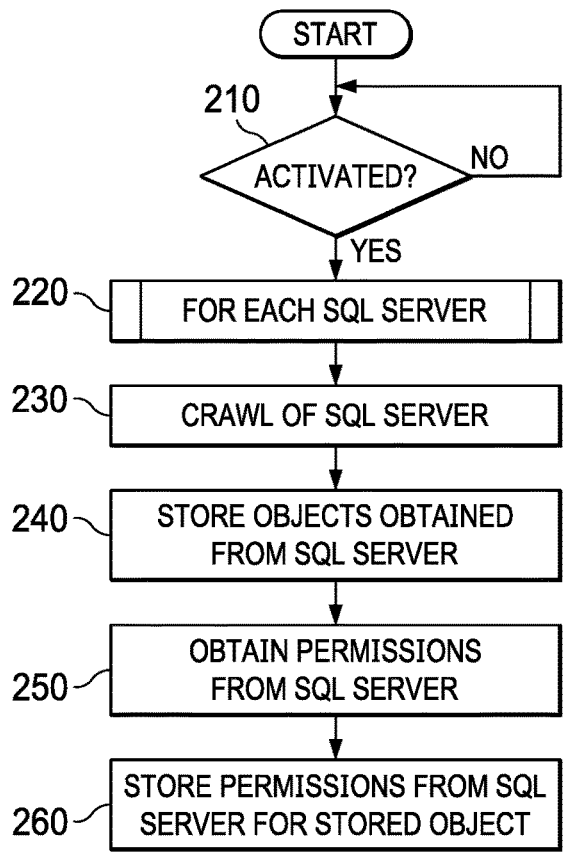
FIG. 2 is a flow diagram of a method that may be utilized for SQL permissions in an identity management system.

It may now be useful to go over embodiments of methods that may be utilized by an identity management system including a SQL permissions collector to obtain and store object and entitlement data on SQL servers within an enterprise environment. Turning first to FIG. 2 then, a flow diagram for one embodiment for the collection and storage of SQL server data from SQL servers within an enterprise environment is depicted. In one embodiment, initially a determination can be made if a permissions collection is to occur (STEP 210). For example, a permissions collector may be a service that can be activated by request, at a set schedule, or by some other activation mechanism.

When activated, permission data from all the SQL servers across the enterprise environment may be obtained. Specifically, for each SQL server in the enterprise (STEP 220) data may obtained in two operations.

The first operations may be a crawl of the associated SQL server (STEP 230). During the crawl all the databases of the associated SQL server may be iterated over and all the objects of each database of the SQL server obtained. A representation of these obtained SQL server objects can be created and stored in the identity management data of the identity management system (STEP 240).

During the harvest (e.g., the second operations) each object obtained and stored from the crawl is accessed at the SQL server to get its permissions, including direct and explicit permissions for users and groups, inherited permissions, implicit permissions, or other permissions for the object (STEP 250).

In one embodiment, during this permissions collection, permissions on the objects of each database of that SQL server may be determined (e.g., server level permission, database permissions, table level permission, object level permissions, etc.). Each of these permissions may be associated with one or more identifiers of users or groups who have been assigned that permission by the SQL server. Such an identifier may, for example, a SID as is used in certain Microsoft environments.

A representation of these obtained SQL server permissions can be created in the identity management data and linked with the corresponding object to which the permission applies (STEP 260). This representation may include an identifier for the permission, along with a link to the object to which the permission applies and an identifier of each user or group who has that permission. Again, this identifiers may be the SID of that user or group.

Thus, because the data model utilized by the identity management system to store the identity management data may include a representation of identities in an identity cube that includes an identifier for that identity or groups to which that identity belongs, and each SQL server entitlement includes an identifier for each identity or group to which that entitlement has been granted along with a link to each SQL server object to which that entitlement pertains, all of an identity's SQL entitlements, and the objects to which those entitlements apply, can be determined by correlating the identifiers associated with an identity and the identifiers associated with the SQL server entitlements.

Moreover, when SQL server permissions are obtained or determined, permissions on sub-objects of these objects may also be obtained or determined. For example, permissions on sub-objects of an object (which are themselves objects) may be provided by the SQL server. An SQL permissions model that describes the database or server permissions for the SQL server can be utilized to determine sub-objects of an object that are implicitly granted the permissions on an object (e.g., if an identity has a permission on a database it may implicitly be assigned that permission on each table of the database). Such a permissions model may allow an identity's permissions on sub-objects of an object to be determined from that identity's permission on an object.

Figure 4:
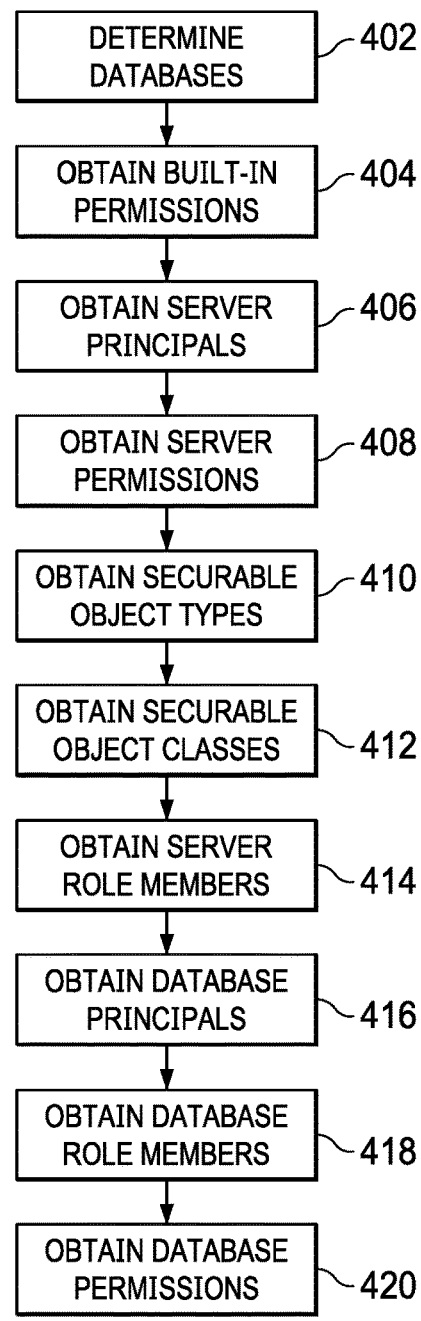
FIG. 4 a flow diagram of a method for a harvest process.
Figure 3:
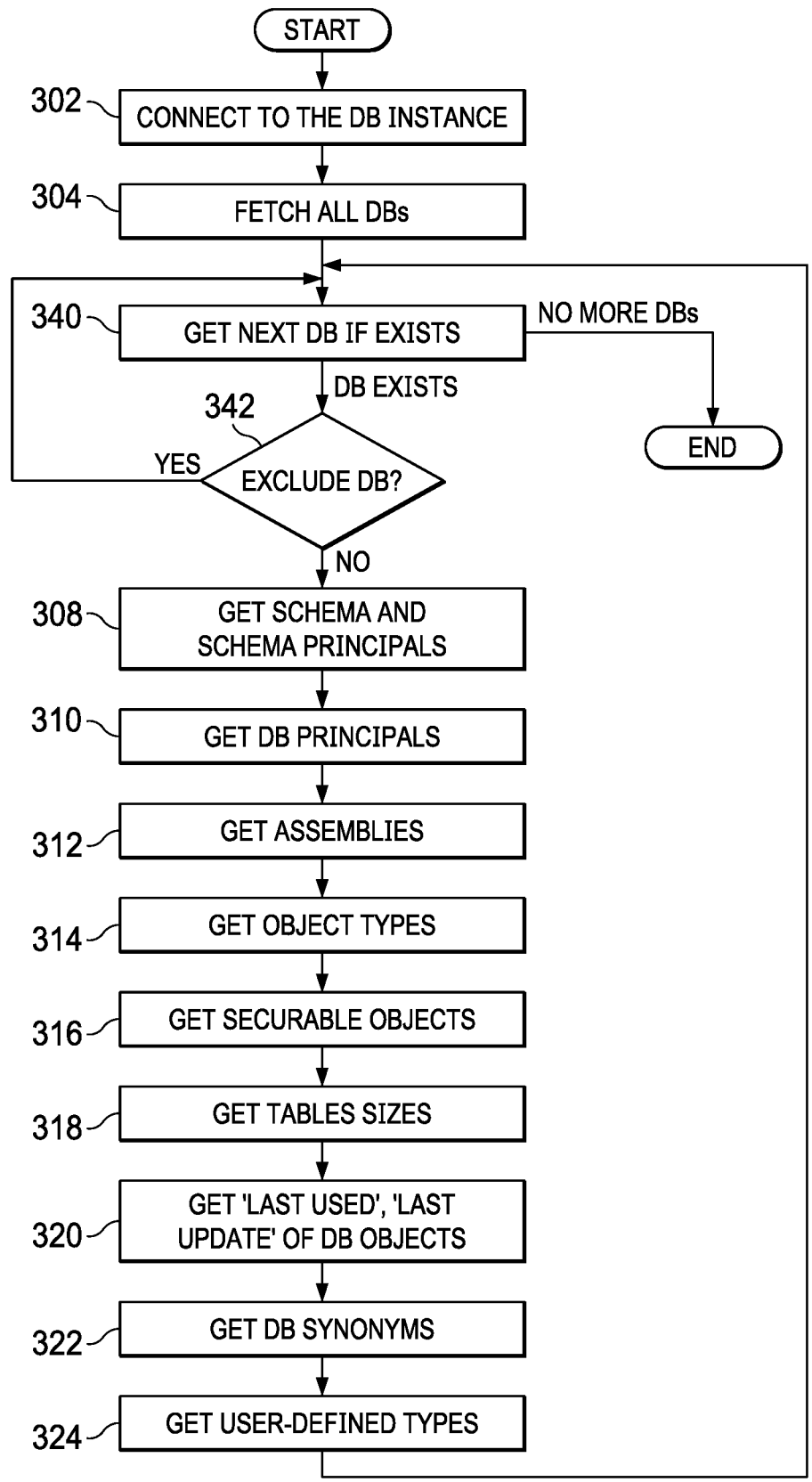
FIG. 3 a flow diagram of a method for a crawl process.

To elaborate on each of the crawl and harvest processes in more detail attention is directed to FIGS. 3 and 4. Referring first to FIG. 3, a flow diagram for one embodiment of a method for a crawl process that may be performed by an identity management system is depicted. The crawl process may go over all the databases in an SQL server instance, obtain the objects of those databases and store the objects (e.g., representations of those objects 0 in the identity management data of the identity management system. Initially, the configuration of the SQL server being crawled is used to connect to the SQL server instance and query (determine) all databases of that SQL server (STEPS 302 and 304). For example, by using the query: SELECT name, database_id, owner_sid, create_date, state, is_read_only, user_access FROM sys.databases.

For each of the databases, check if it is excluded (e.g., by some configuration or other criteria, such as those set by an administrator or the like) and if not obtain the data on the database (STEPS 340, 342). Here, DATABASE=the current database, [DATABASE_ID]=the current database Id. In particular, the Schemas and Principals (the schema owner) may be obtained from the database (STEP 308) using for example, the following statement:SELECT s.name, s.schema_id, p.sid, p.type principal_type, p.name collate SQL_Latin1_General_CP1_CI_AS principal_name FROM [DATABASE].sys.schemas s INNER JOIN [DATABASE].sys.database_principals p ON p.principal_id=s.principal_id.

The database Principals (Database users) can be obtained (STEP 310) using, for example, the following statement: SELECT name, principal_id, type, type_desc, default_schema_name, create_date, modify_date, sid, is_fixed_role FROM [DATABASE].sys.database_principals.

The database assemblies can be obtained (STEP 312) using, for example, the following statement: SELECT name, principal_id, assembly_id FROM [DATABASE].sys.assemblies.

The database object type can be obtained (STEP 314) using, for example, the following statement: SELECT c.class, m.class_type_desc, m.class_type, m.securable_class_desc FROM sys.securable_classes c INNER JOIN sys.dm_audit_class_type_map m ON c.class_desc=m.securable_class_desc COLLATE SQL_Latin1_General_CP1_CI_AS WHERE m.class_type not in ('TR', 'S').

The database securable objects can then be obtained (STEP 316). This query may utilize the object type (e.g., as obtained in STEP 314) and may be, for example: SELECT name, object_id, schema_id, type, create_date, modify_date FROM [DATABASE].sys.all_objects WHERE type in ({Object types queried before (e.g., in STEP 314)}).

All the table sizes (in bytes) can then be obtained (STEP 318) using for example the following statement: SELECT t.object_id as ObjectId, CAST(ROUND((SUM (a.used_pages)/128.00*1024.00*1024.00), 2) AS NUMERIC(36, 0)) AS Used, SUM(a.total_pages)*8*1024 AS Total FROM [FAMDB].sys.tables t LEFT JOIN [FAMDB].sys.indexes i ON t.OBJECT_ID=i.object_id LEFT JOIN [FAMDB].sys.partitions p ON i.object_id=p.OBJECT_ID AND i.index_id=p.index_id LEFT JOIN [FAMDB].sys.allocation units a ON p.partition_id=a.container_id GROUP BY t.object_id.

The 'Last Access' and 'Last Update' of the database objects obtained can then be obtained (STEP 320) using, for example, the following statement: SELECT object_name (x.object_id), x.object_id, max(x.MaxDate) last_access, max(last_user_update) last_user_update FROM (SELECT o.object_id, s.last_user_update, (SELECT Max(v) FROM (VALUES (s.last_user_seek), (s.last_user_scan), (s.last_user_lookup)) AS value(v)) as [MaxDate] FROM [FAMDB].sys.dm_db_index_usage_stats s INNER JOIN [FAMDB].sys.all_objects o ON s.object_id=o.object_id WHERE s.database_id=[DATABASE_ID])×GROUP BY x.object_id.

The synonyms and user defined types can then be obtained from the database (STEPS 322, 324) using the following statements: SELECT name, object_id, schema_id, create_date, modify_date, base_object_name FROM [DATABASE].sys.synonyms and SELECT name, user_type_id, schema_id FROM [DATABASE].sys.types WHERE is_user_defined=1.

Once the crawl process obtain the objects of the databases of an SQL server, a representation of these obtained SQL server objects can be created and stored in the identity management data of the identity management system. During the harvest (e.g., the second operations) each object obtained and stored from the crawl is accessed at the SQL server to get its permissions. Each of these permissions may be associated with one or more identifiers of users or groups who have been assigned that permission by the SQL server. Such an identifier may, for example, a SID as is used in certain Microsoft environments.

To illustrate in more detail, the harvesting or permission collection is the process that will go over all the databases in the SQL server and their securable objects, fetch their permissions and save this data in the identity management data at the identity management system. In some embodiments, all the data on permissions of objects of the SQL server may be gathered from each database but the only permission which will be saved to the identity management data are of securable objects received by the crawl process. Therefore, in some cases, at least one crawl process is completed before running a permission collection. The permission collection may save for each securable all its permissions and all its inherited permissions. This may facilitate, for example, a complete picture of an object's permissions in certain user interfaces.

Moving then to FIG. 4, one embodiment of a method for harvesting permissions (e.g., the obtaining of securable objects permissions) is depicted. Initially, the configuration of the SQL server being crawled is used to connect to the SQL server instance and query (determine) all databases of that SQL server (STEP 402). For example, by using the query: SELECT name, database_id, owner_sid, create_date, state, is_read_only, user_access FROM sys.databases.

The built-in permissions can then be obtained (STEP 404), using, for example, the following statement: SELECT class_desc, permission_name, type, covering_permission_name, parent_class_desc, parent_covering_permission_name FROM sys.fn_builtin_permissions(default).

The SQL server principals can then be obtained (STEP 406). Principals usually includes Logins, Server Roles and Certificates that maps to a Login. The following statement may be used to obtain such principals: SELECT name, principal_id, sid, type, type_desc, is_disabled, create_date, modify_date, default_database_name, is_fixed_role FROM sys.server_principals.

The SQL server permissions can then be obtained (STEP 408) using the following statement: SELECT s.sid, s.name, s.type principal_type, p.class, p.class_desc, p.major_id, p.minor_id, p.grantee_principal_id, p.grantor_principal_id, p.type, p.permission_name, p.state, p.state_desc FROM sys.server_permissions p INNER JOIN sys.server_principals s ON p.grantee_principal_id=s.principal_id.

All securable object types (e.g., excluding Triggers and system inner Tables) can be obtained (STEP 410) with, for example, the following statement: SELECT c.class, m.class_type_desc, m.class_type, m.securable_class_desc FROM sys.securable_classes c INNER JOIN sys.dm_audit_class_type_map m ON c.class_desc=m.securable_class_desc COLLATE SQL_Latin1_General_CP1_CI_AS WHERE m.class_type not in ('TR', 'S').

All securable object classes can then be obtained (STEP 412) from the SQL server using, for example, the following statement: SELECT class_desc, class FROM sys.securable_classes WHERE class is not null AND class_desc is not null.

The SQL server role members can then be obtained (STEP 414). These are connections between a principal and role. These roles may be obtained using the following statement: SELECT role_principal_id, member_principal_id FROM sys.server_role_members.

The database principals can then be obtained (STEP 416). These may be obtained using one dynamic query that is assembled by joining a query for each of the included databases. For example, the following query is an example when there are two databases—DB_1 and DB_2: SELECT [database], s.name collate SQL_Latin1_General_CP1_CI_AS name, s.schema_id, s.sid, s.principal_type, s.principal_name FROM (SELECT N'DB_1' [database], s.name, s.schema_id, p.sid, p.type principal_type, p.name collate SQL_Latin1_General_CP1_CI_AS principal_name FROM [DB_1].sys.schemas s INNER JOIN [DB_1].sys.database_principals p ON p.principal_id=s.principal_id union all SELECT N'DB_2' [database], s.name, s.schema_id, p.sid, p.type principal_type, p.name collate SQL_Latin1_General_CP1_CI_AS principal_name FROM [DB_2].sys.schemas s INNER JOIN [DB_2].sys.database_principals p ON p.principal_id=s.principal_id) s As another example, the following query is an example when there are two databases—DB_1 and DB_2 SELECT x.[database], x.name collate SQL_Latin1_General_CP1_CI_AS name, x.principal_id, x.type, x.type_desc, x.default_schema_name collate SQL_Latin1_General_CP1_CI_AS default_schema_name, x.create_date, x.modify_date, x.sid, x.is_fixed_role FROM (SELECT N'DB_1' [database], name, principal_id, type, type_desc, default_schema_name, create_date, modify_date, sid, is_fixed_role FROM [DB_1].sys.database_principals union all SELECT N'DB_2' [database], name, principal_id, type, type_desc, default_schema_name, create_date, modify_date, sid, is_fixed_role FROM [DB_2].sys.database_principals)x For each included database, its role members can be obtained (STEP 418) using, for example, a query such as: SELECT role_principal_id, member_principal_id FROM [DATABASE].sys.database_role_members. For each included database, its permissions can be obtained (STEP 420) using a query such as: SELECT s. sid, s.name, s.type principal_type, p.class, p.class_desc, p.major_id, p.minor_id, p.grantee_principal_id, p.grantor_principal_id, p.type, p.permission_name, p.state, p.state_desc FROM [DATABASE].sys.database_permissions p INNER JOIN [DATABASE].sys.database_principals s ON p.grantee_principal_id=s.principal_id WHERE s.type IN ('R', 'A') OR s.sid in (SELECT sid from sys.server_principals where sid is not null) OR s.name='guest'.

A representation of these obtained SQL server permissions can be created in the identity management data and linked with the corresponding object to which the permission applies. This representation may include an identifier for the permission, along with a link to the object to which the permission applies and an identifier of each user or group who has that permission. Again, this identifiers may be the SID of that user or group.

Thus, based on the data obtained from the SQL server instances within an enterprise an environment a user may interact with the identity management system through a user interface to access data this data on identities, SQL entitlements and SQL objects. In particular, a user interface may offer the ability for a user to specify (e.g., or search for) an identity (e.g., user or group) and view all of that identity's SQL server entitlements (e.g., including the objects corresponding to those entitlements), even when such SQL entitlements span multiple SQL servers within the enterprise environment or when such entitlements have been granted to user through inheritance by virtue of that identity's association with a group. Thus, users of an enterprise can view all their SQL data holistically in one place through a single interface.

Specifically, when a particular identity is specified through the interface the identity of a user may be accessed to obtain the identity's identifier (e.g., a SID for the identity) and the identifier for the identity may be used to determine the SQL server entitlements (and associated SQL objects) associated with that identity's identifier using the identifier (e.g., SID) associated with the SQL server entitlements. Moreover, using the identity's identifier any groups associated with that identity may be determined and the identifier for those groups (e.g., a SID associated with the group) may be used to determine the SQL server entitlements (and associated objects) associated with that group's identifier using the identifier (e.g., SID) associated with the SQL server entitlements.

Additionally, once the SQL server entitlements (including their associated SQL server objects) are determined, an SQL permissions model may be accessed to determine if there are any objects that are sub-objects of the determined SQL server objects for those entitlements such that the identity has been implicitly granted that entitlement on those (sub) objects. Specifically, for each determined SQL server object associated with an SQL server entitlement determined for an identity, the determined SQL permissions model may be accessed and used to identify any objects that are sub-objects of that object that are granted the same entitlement as the entitlement granted on the (parent) object 107. Each identified (sub) object granted the same entitlement as the identified (parent) object may be added to the list of entitlements and SQL server objects associated with the identity. This determination may be done recursively for each object and (sub) object until there are no more sub-objects for which that entitlement has been implicitly assigned to the identity.

Such an interface may similarly be used to access or determine identities or entitlements associated with a particular (or meeting certain criteria) SQL database object (or type of SQL database object); SQL database objects or identities associated with a particular (or meeting certain criteria) SQL entitlement; or to obtain, determine, sort or otherwise view or filter SQL server data from SQL servers across the enterprise environment.

Figure 5B:
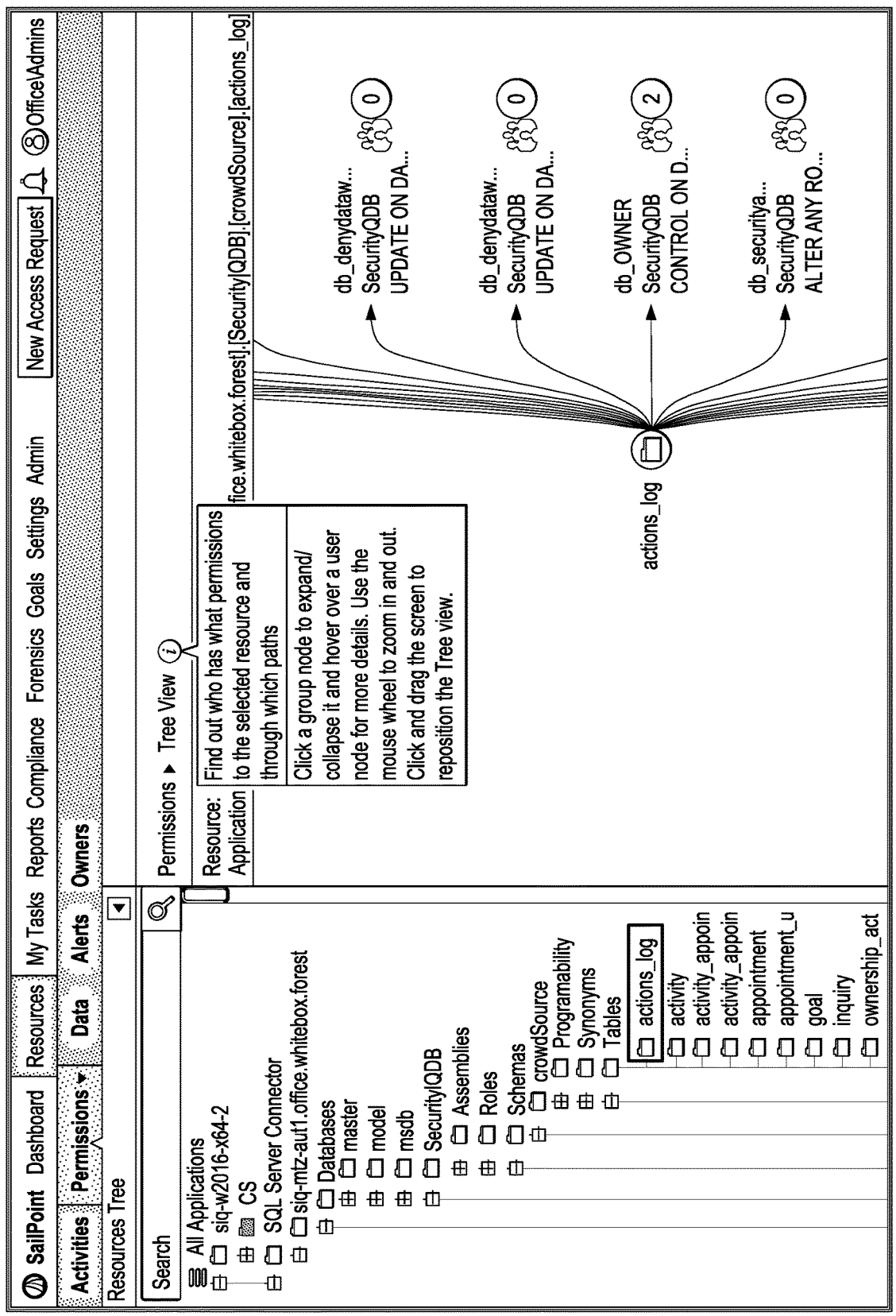
Figure 5C:
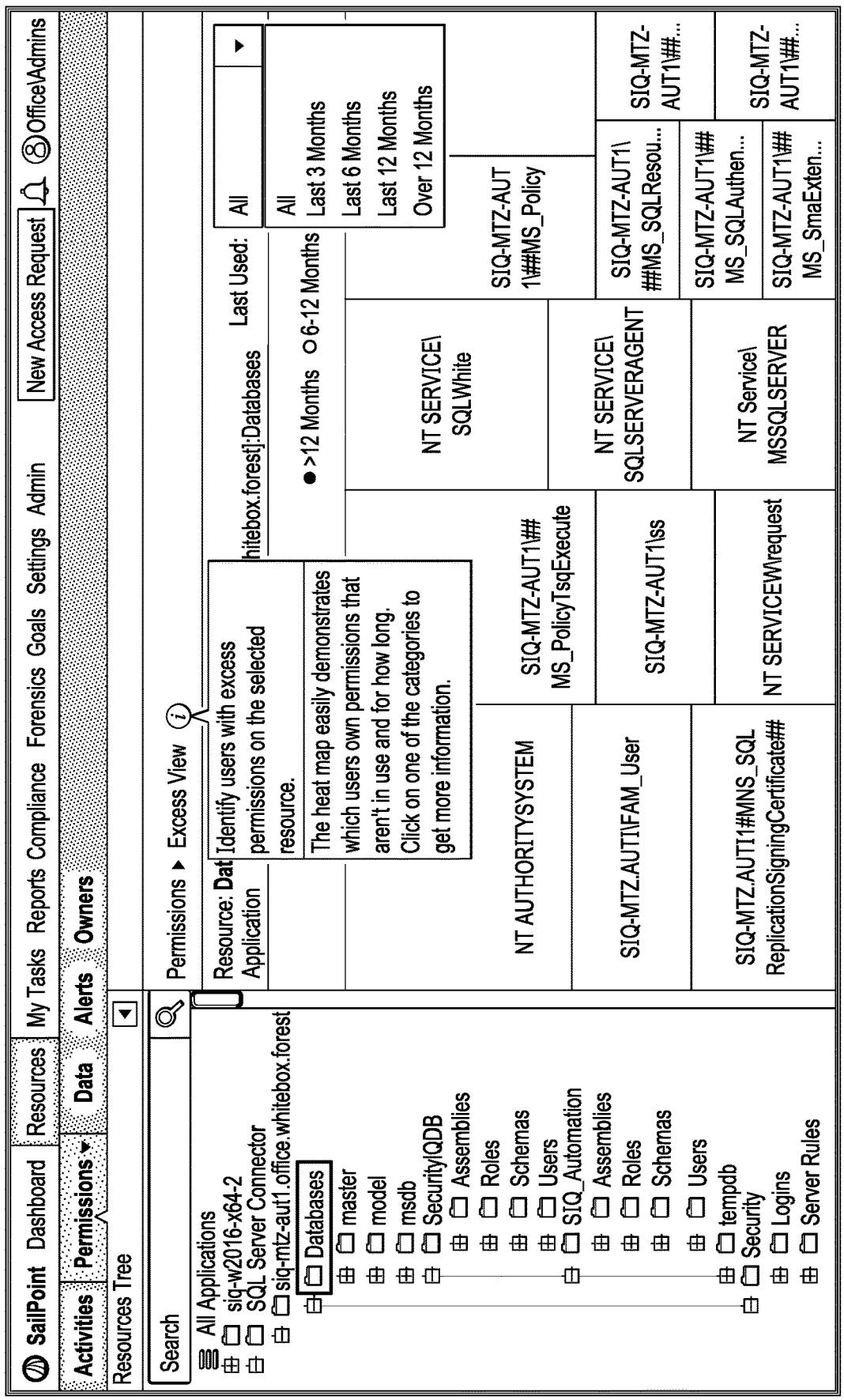

It may now be useful to go over embodiments of such user interfaces. Looking then at FIGS. 5A-5C, embodiments of such interfaces are depicted. Specifically, FIG. 5A depicts one embodiment of an interface that may utilized to access SQL entitlements for a particular user, FIG. 5B depicts one embodiment of an interface that may utilized to determine identities that have entitlements to a selected object and the chains (e.g., inheritance or implicit) through which those entitlements are granted, and FIG. 5C depicts one embodiment of an interface that may be utilized to determine SQL objects that have (or haven't) been utilized in a particular amount of time.

In this manner, embodiments of an identity management system collate and collect all data from across enterprises SQL servers and manage and collect such data in a centralized (or centrally accessible) location. By collecting and collating such data, embodiment of an identity management system may allow users to locate all of a single identity's SQL server entitlements across all enterprise SQL servers from a single location, including those SQL server entitlements that are inherited through that identity's association with management structures such as roles or groups or implicitly granted through the structure or schema of the SQL databases themselves. Those skilled in the relevant art will appreciate that the invention can be implemented or practiced with other computer system configurations including, without limitation, multi-processor systems, network devices, mini-computers, mainframe computers, data processors, and the like. Embodiments can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

Although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a set of distributed computers communicatively coupled to a network (for example, the Internet). Any suitable programming language can be used to implement the routines, methods or programs of embodiments of the invention described herein, including R, Python, C, C++, Java, JavaScript, HTML, or any other programming or scripting code, etc. Other software/hardware/network architectures may be used. Communications between computers implementing embodiments can be accomplished using any electronic, optical, radio frequency signals, or other suitable methods and tools of communication in compliance with known network protocols.

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a", "an" or "a set" (and "the" when antecedent basis is "a" or "an") includes both singular and plural of such term, unless clearly indicated within the claim otherwise (i.e., that the reference "a", "an" or "a set" clearly indicates only the singular or only the plural). Also, as used in the description herein and throughout the meaning of "in" includes "in" and "on" unless the context clearly dictates otherwise.

What is claimed is:

1. An identity management system, comprising:
    a processor;
    a non-transitory, computer-readable storage medium, including computer instructions for:
        obtaining identity management data associated with a plurality of source systems in a distributed enterprise computing environment, the obtaining identity management data further comprising:
            initiating a crawl process of the plurality of source systems to obtain database objects of SQL servers of the plurality of source systems, and
            initiating a permission collection service to fetch permissions of the obtained database objects from respective SQL servers of the plurality of source systems;
        the identity management data comprising data on a set of identity management artifacts utilized in identity management in the distributed enterprise computing environment, including a set of identities, SQL database objects and entitlements associated with the SQL database objects, wherein:
            the plurality of source systems include an authoritative source system and the identity management data comprises identity data on a set of identities obtained from the authoritative source system, wherein each of the set of identities is associated with a first identifier for that identity obtained from the authoritative source system,
            the plurality of source systems include at least one SQL server and the identity management data comprises SQL object data on SQL database objects of the SQL server and entitlement data on a set of entitlements, wherein each of the set of entitlements is associated with a second identifier and an associated SQL database object of the SQL database objects;
        receiving a criteria associated with a first identity of the set of identities;
        determining one or more entitlements to SQL database objects based on the second identifier associated with each of the set of entitlements and the first identifier for the first identity, wherein the one or more entitlements are associated with the first identity and are determined by correlating the second identifier associated with one or more entitlements with the first identifier for the first identity; and
        presenting the one or more entitlements and associated SQL database objects in association with the first identity.

2. The identity management system of claim 1, wherein the first identifier and the second identifier is a Security IDentifier (SID).

3. The identity management system of claim 1, wherein the first identifier is associated with a group to which the first identity belongs.

4. The identity management system of claim 3, where at least one of the one or more entitlements is inherited by the first identity through the group.

5. The identity management system of claim 1, wherein a first entitlement of the one or more entitlements is to a first SQL database object and a second entitlement of the one or more entitlements is to a second SQL database object that is a child object of the first SQL database object, and wherein the second entitlement was determined based on the second SQL database object being a child object of the first SQL database object.

6. The identity management system of claim 5, wherein the second entitlement was determined utilizing a SQL permission model.

7. The identity management system of claim 1, wherein the at least one SQL server comprises multiple SQL servers and the one or more entitlements comprises entitlements obtained from each of the multiple SQL servers.

8. A method, comprising:
obtaining identity management data associated with a plurality of source systems in a distributed enterprise computing environment, the obtaining identity management data further comprising:
initiating a crawl process of the plurality of source systems to obtain database objects of SQL servers of the plurality of source systems, and
initiating a permission collection service to fetch permissions of the obtained database objects from respective SQL servers of the plurality of source systems;
the identity management data comprising data on a set of identity management artifacts utilized in identity management in the distributed enterprise computing environment, including a set of identities, SQL database objects and entitlements associated with the SQL database objects, wherein:
the plurality of source systems include an authoritative source system and the identity management data comprises identity data on a set of identities obtained from the authoritative source system, wherein each of the set of identities is associated with a first identifier for that identity obtained from the authoritative source system,
the plurality of source systems include at least one SQL server and the identity management data comprises SQL object data on SQL database objects of the SQL server and entitlement data on a set of entitlements, wherein each of the set of entitlements is associated with a second identifier and an associated SQL database object of the SQL database objects;
receiving a criteria associated with a first identity of the set of identities;
determining one or more entitlements to SQL database objects based on the second identifier associated with each of the set of entitlements and the first identifier for the first identity, wherein the one or more entitlements are associated with the first identity and are determined by correlating the second identifier associated with one or more entitlements with the first identifier for the first identity; and
presenting the one or more entitlements and associated SQL database objects in association with the first identity.

9. The method of claim 8, wherein the first identifier and the second identifier is a Security IDentifier (SID).

10. The method of claim 8, wherein the first identifier is associated with a group to which the first identity belongs.

11. The method of claim 10, where at least one of the one or more entitlements is inherited by the first identity through the group.

12. The method of claim 8, wherein a first entitlement of the one or more entitlements is to a first SQL database object and a second entitlement of the one or more entitlements is to a second SQL database object that is a child object of the first SQL database object, and wherein the second entitlement was determined based on the second SQL database object being a child object of the first SQL database object.

13. The method of claim 12, wherein the second entitlement was determined utilizing a SQL permission model.

14. The method of claim 8, wherein the at least one SQL server comprises multiple SQL servers and the one or more entitlements comprises entitlements obtained from each of the multiple SQL servers.

15. A non-transitory computer readable medium, comprising instructions for:
obtaining identity management data associated with a plurality of source systems in a distributed enterprise computing environment, the obtaining identity management data further comprising:
initiating a crawl process of the plurality of source systems to obtain database objects of SQL servers of the plurality of source systems, and
initiating a permission collection service to fetch permissions of the obtained database objects from respective SQL servers of the plurality of source systems;
the identity management data comprising data on a set of identity management artifacts utilized in identity management in the distributed enterprise computing environment, including a set of identities, SQL database objects and entitlements associated with the SQL database objects, wherein:
the plurality of source systems include an authoritative source system and the identity management data comprises identity data on a set of identities obtained from the authoritative source system, wherein each of the set of identities is associated with a first identifier for that identity obtained from the authoritative source system,
the plurality of source systems include at least one SQL server and the identity management data comprises SQL object data on SQL database objects of the SQL server and entitlement data on a set of entitlements, wherein each of the set of entitlements is associated with a second identifier and an associated SQL database object of the SQL database objects;
receiving a criteria associated with a first identity of the set of identities;
determining one or more entitlements to SQL database objects based on the second identifier associated with each of the set of entitlements and the first identifier for the first identity, wherein the one or more entitlements are associated with the first identity and are determined by correlating the second identifier associated with one or more entitlements with the first identifier for the first identity; and
presenting the one or more entitlements and associated SQL database objects in association with the first identity.

16. The non-transitory computer readable medium of claim 15, wherein the first identifier and the second identifier is a Security IDentifier (SID).

17. The non-transitory computer readable medium of claim 15, wherein the first identifier is associated with a group to which the first identity belongs.

18. The non-transitory computer readable medium of claim 17, where at least one of the one or more entitlements is inherited by the first identity through the group.

19. The non-transitory computer readable medium of claim 15, wherein a first entitlement of the one or more entitlements is to a first SQL database object and a second entitlement of the one or more entitlements is to a second SQL database object that is a child object of the first SQL database object, and wherein the second entitlement was determined based on the second SQL database object being a child object of the first SQL database object.

20. The non-transitory computer readable medium of claim 19, wherein the second entitlement was determined utilizing a SQL permission model.

21. The non-transitory computer readable medium of claim 15, wherein the at least one SQL server comprises multiple SQL servers and the one or more entitlements comprises entitlements obtained from each of the multiple SQL servers.

\* \* \* \* \*